United States Patent [19]

Henson et al.

[11] 4,244,220
[45] Jan. 13, 1981

[54] SKI-POLE SUPPORT STRUCTURE FOR A STEM AND DIAL-TYPE THERMOMETER

[75] Inventors: John W. Henson, Orange, Conn.; Robert J. Prove, Claymont, Del.

[73] Assignee: Dresser Industries, Inc., Dallas, Tex.

[21] Appl. No.: 47,653

[22] Filed: Jun. 11, 1979

[51] Int. Cl.³ .................. G01K 1/14; A63C 11/12
[52] U.S. Cl. .................. 73/343 R; 73/363.9; 280/819; D21/230
[58] Field of Search ............. 73/343 R, 352, 431 R; 280/11.37 H, 11.37 E; D21/230

[56] References Cited

U.S. PATENT DOCUMENTS

| 2,435,632 | 2/1948 | Mabey | 73/362.8 |
|---|---|---|---|
| 3,096,651 | 7/1963 | Gorgens et al. | 73/363.9 |
| 3,253,466 | 5/1966 | Chough | 73/343 R |
| 3,277,714 | 10/1966 | Crandell et al. | 73/363.9 |
| 3,543,586 | 12/1970 | Waite | 73/431 |
| 3,592,059 | 7/1971 | Chilton | 73/362.8 |
| 3,605,498 | 9/1971 | Lamb | 73/431 X |
| 3,857,286 | 12/1974 | Bissel et al. | 73/363.9 |
| 4,082,302 | 4/1978 | Albrecht | 280/11.37 H |

Primary Examiner—Daniel M. Yasich
Attorney, Agent, or Firm—Daniel Rubin

[57] ABSTRACT

An annular recessed snap-in fit is provided internally juxtaposed to an opening through the top surface of a molded plastic ski pole grip handle for supporting the dial case of a received stem and dial-type thermometer. A heat transfer composition within the tubular metal shank of the ski pole is adapted to support the distal end of a received thermometer in thermal communication with the ambient weather while convenient readability of the thermometer is provided through the top face opening in the grip handle.

7 Claims, 3 Drawing Figures

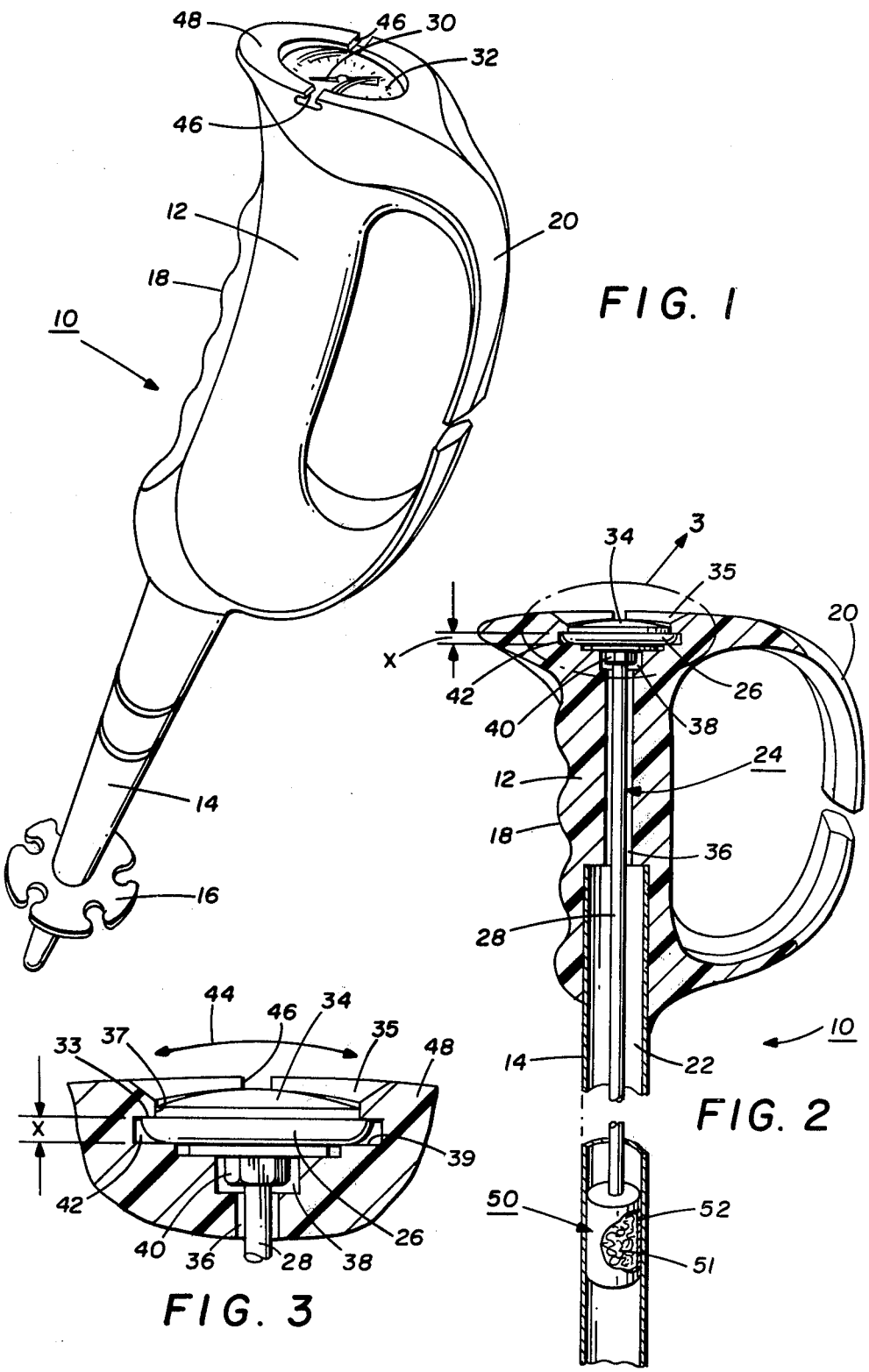

SKI-POLE SUPPORT STRUCTURE FOR A STEM AND DIAL-TYPE THERMOMETER

TECHNICAL FIELD

The field of art to which the invention pertains comprises the art of measuring and testing and specifically to instrument support structures therefor.

BACKGROUND OF THE INVENTION

Stem and dial-type thermometers, as disclosed for example in U.S. Pat. Nos. 3,096,651 and 3,857,286, typically employ a bi-metal coil helically contained in a small diameter tubular stem centrally connected to the underside of a transversely positioned case. The case contains a dial with imprinted values of temperature while a pointer connected to the inward end of the bi-metal coil is moved over the dial face in response to temperature induced winding and unwinding movements of the coil.

In the so-called "pocket size" stem and dial type thermometer, the casing is on the order of 1¾ inches outside diameter supporting a 5 to 8 inch stem length of approximately 9/64 inches outside diameter. A common application for the pocket size thermometer of that type is by maintenance personnel who carry such thermometers in their pocket for on-site determination of in-duct air temperatures or the like. Being that their constructions are somewhat fragile, the pocket size thermometers are most usually utilized in static or near static situations in which the maximum dynamic force likely to be encountered against the stem would be the flow force of passing air.

A recently recognized application for the pocket size stem and dial-type thermometer is by skiers individually wanting to ascertain air temperatures on the ski slopes for assessing clothing needs, ski wax requirements, etc. This information is frequently supplied by the ski lodge staff to the skiers via posting or telephone, or sometimes is obtained from local television or radio broadcasts. A difficulty with the individual thermometer has been the inconvenience of carrying and using such thermometers with the heavy clothing and under the climatic conditions commonly encountered when skiing. Despite recognition of the problem, a ready solution has not heretofore been known.

BRIEF SUMMARY OF THE INVENION

The invention relates to support structure for securing a stem and dial-type thermometer. More specifically, the invention relates to such a support structure internally provided within the grip handle of a ski pole as to afford a conveniently readable thermometer providing temperature indications of the ambient weather that is continuously available to the skier. By being supported in the ski pole the difficulty of carrying and using a thermometer is eliminated. For all practical purposes, the thermometer can function independently while being an integral part of the ski pole as not to impose any perceptible burden on the skier.

The foregoing is achieved in accordance with the invention by an annular recessed snap-in fit internally formed inward beneath an opening in the top surface of a ski pole grip handle. The snap-in fit serves to support and protect the thermometer against the likelihood of impact while rendering the thermometer dial readily readable through the surface opening. The thermometer stem connection extends downward from the snap-in fit support through a bore in the handle to its distal end, which end is received in a heat transfer medium positioned in thermal communication with the tubular shank of the ski pole. In this manner, the stem is maintained in thermal communication with the shank walls and via the walls with the ambient weather thereabout. Since a thermometer, by virtue of the support structure of the invention, is both supportable and replaceable if need be by the snap-in relation of the support structure, the convenience and virtues of having a thermometer readily available to a skier has been reduced to a practicality.

It is therefore an object of the invention to provide a novel support structure for securing a stem and dial-type thermometer in a ski pole for providing temperature indications of ambient weather to a skier using such a pole.

It is a further object of the invention to effect the last recited object with a snap-in fit providing impact protection to the thermometer while at the same time enabling the thermometer to be readily replaced in the event a replacement need arises.

It is a still further object of the invention to effect the foregoing objects with an inexpensive construction that is readily amenable to relatively low cost, high production capability.

BRIEF DESCRIPTION OF THE DRAWINGS

FIG. 1 is a topside isometric view of a typical ski pole including the thermometer support hereof;

FIG. 2 is a fragmentary sectional elevation through the handle and shank of the ski pole of FIG. 1; and FIG. 3 is an enlarged view of the encircled portion 3 of FIG. 2.

Referring now to the drawings, there is disclosed in FIG. 1 a ski pole designated 10 of a commercially available type in which the invention hereof has been incorporated. Comprising the ski pole is a grip handle 12 of a relatively soft plastic composition secured to an elongated tubular shank 14, usually of metal, and which near its free end supports a basket 16 secured thereon. For convenience of gripping, handle 12 includes integral finger pockets 18 while an integral rear hand guard 20 serves to minimize dropping the ski pole in use. For connecting grip handle 12 to shank 14, an internal bore 22 is provided centrally extending inward from the underside of the handle and sized to afford a press of cemented fit with the top end of shank 14 when the latter is forced inward thereof.

Thermometer 24 anticipated for use herewith, is of a commercially available type as exemplified by the disclosure of U.S. Pat. No. 3,857,286 and is comprised of an annular case 26 which with transparent crystal 34 defines an annular ledge 33. At its underside, the case supports a laterally extending elongated tubular stem 28 containing a bi-metal coil (not shown) that operates a pointer 30 supported opposite a dial 32, both of which are enclosed by crystal 34. Zeroing is effected by means of adjustment nut 40.

For receiving and supporting thermometer case 26 in accordance herewith, there is provided in the top surface 48 of grip handle 12 an enlarged recessed opening 35 chamfered inward to a smaller diameter bore 37. The latter bore communicates inward with juxtaposed enlarged annular recess 42 which in turn communicates with counterbore 38 via intermediate shoulder 39. Extending axially downward from counterbore 38 is a thrubore 36 connecting with enlarged shank bore 22. Side slots 46 enable flexing opening 35 outwardly in the direction of arrows 44 as will be explained.

It can be seen that the foregoing openings and bores cooperate to receive and accommodate the various components of thermometer 24 in a custom matched sized relation therewith. Specifically, bore 37 is sized to receive and expose crystal 34 through opening 35 while the top and lower surfaces of recess 42 act to grip case 26. Counterbore 38 is sized to accommodate thermometer nut 40 while thrubore 36 closely accommodates stem 28. Transverse slots 46 in the top face 48 of the grip handle enable slight separation of the handle thereat for installed placement of thermometer 24 inward past opening 37 into recess 42 and when released enables the resiliency thereof to effect a snap fit grip of the case. For that purpose, axial dimension "X" of recess 42 is closely matched to that of case 26. When emplaced, crystal 34 is positioned inward of opening 35 below face 48 to provide protection thereat from any forces of impact inflicted against the handle.

In order to provide good thermal communication from internally of the ski pole to the ambient weather conditions outward thereof, there is press fit in shank 14 a heat transfer media designated 50 supporting the distal end of stem 28. Media 50 can comprise any of a variety of known thermal transfer compositions such as a rust resistant metal wood 51 of aluminum or bronze retained in a metal cup 52 supported in thermally conductive relation with the wall of shank 14. In this manner, ambient weather temperature to which shank 14 is exposed is readily conducted through the shank and heat transfer media 50 to stem 28 for registering via pointer 30 on thermometer dial 32.

By the above description there is disclosed a novel construction for supporting a stem and dial-type thermometer in a convenient and expedient manner to enable ski weather temperatures to be readily and continuously communicated to the individual skier on the slopes. Being carried by the ski pole eliminates the problem of attempting to determine such temperature conditions from a loosely carried thermometer or depending on temperature information provided previously during the day. The thermometer being supported in this manner is protected against impact while affording a great convenience and advantage not previously available during the course of a ski run.

Since many changes could be made in the above construction and many apparently widely different embodiments of this invention could be made without departing from the scope thereof, it is intended that all matter contained in the drawing and specification shall be interpreted as illustrative and not in a limiting sense.

The embodiments of the invention in which an exclusive property or privilege is claimed are defined as follows:

1. In a ski pole for skiing service including a grip handle and an elongated shank secured to the underside of the grip handle and extending away therefrom, thermometer support means defined as a passage extending internally of at least said grip handle, said support means being of size adapted to receive a stem and dial thermometer with the stem extending from the dial portion to its distal end being in thermal communication with ambient weather temperature thereabout and with indicia of the received thermometer exposed to view at a surface of said grip handle.

2. In a ski pole according to claim 1 in which said support means is adapted to secure a received stem and dial thermometer in a snap-in relation within said grip handle.

3. In a ski pole according to claim 2 in which said grip handle is of plastic composition, said support means includes an opening extending inward from a top surface of said grip handle and said grip handle top surface includes a defined split in its surface extending outward from said opening to enable selectively enlarging said opening for receipt of a stem and dial thermometer into said snap-in relation.

4. In a ski pole according to claim 3 in which said snap-in relation afforded by said support means comprises an annular recess tandemly juxtaposed inward of said opening for the indicia of a received stem and dial thermometer to be exposed to view through said opening.

5. In a ski pole according to claim 1, 2, 3 or 4 in which said shank is tubular and there is included thermal communication means positioned within said tubular shank to receive the distal stem end of a received stem and dial thermometer and to communicate ambient weather temperature thereto.

6. In a ski pole according to claim 5 in which said tubular shank is metal and said thermal communication means comprises metal wool.

7. In a ski pole according to claim 6 including a stem and dial thermometer emplaced in said support means.

* * * * *